United States Patent
Schoenenborn

(10) Patent No.: US 9,382,916 B2
(45) Date of Patent: Jul. 5, 2016

(54) METHOD FOR MACHINING AN INTEGRALLY BLADED ROTOR

(75) Inventor: Harald Schoenenborn, Karlsfeld (DE)

(73) Assignee: MTU Aero Engines GmbH, Munich (DE)

(*) Notice: Subject to any disclaimer, the term of this patent is extended or adjusted under 35 U.S.C. 154(b) by 1784 days.

(21) Appl. No.: 11/816,079

(22) PCT Filed: Feb. 4, 2006

(86) PCT No.: PCT/DE2006/000173
§ 371 (c)(1),
(2), (4) Date: Aug. 10, 2007

(87) PCT Pub. No.: WO2006/084438
PCT Pub. Date: Aug. 17, 2006

(65) Prior Publication Data
US 2008/0134504 A1 Jun. 12, 2008

(30) Foreign Application Priority Data
Feb. 12, 2005 (DE) .................. 10 2005 006 414

(51) Int. Cl.
| F04D 29/32 | (2006.01) |
| F01D 5/00 | (2006.01) |
| F01D 5/16 | (2006.01) |
| F01D 5/20 | (2006.01) |
| F01D 5/34 | (2006.01) |
| F02C 7/045 | (2006.01) |
| F04D 29/66 | (2006.01) |

(52) U.S. Cl.
CPC .............. *F04D 29/324* (2013.01); *F01D 5/005* (2013.01); *F01D 5/16* (2013.01); *F01D 5/20* (2013.01); *F01D 5/34* (2013.01); *F02C 7/045* (2013.01); *F04D 29/321* (2013.01); *F04D 29/668* (2013.01); *F05D 2260/961* (2013.01); *Y10T 29/49318* (2015.01)

(58) Field of Classification Search
USPC ......................................... 29/889.1; 416/140
See application file for complete search history.

(56) References Cited

U.S. PATENT DOCUMENTS

| 6,042,338 | A | 3/2000 | Brafford et al. |
| 7,024,744 | B2 * | 4/2006 | Martin et al. ................ 29/401.1 |
| 2004/0241003 | A1 * | 12/2004 | Roy et al. .................. 416/236 R |
| 2005/0160598 | A1 * | 7/2005 | Heilenbach et al. ......... 29/889.2 |

FOREIGN PATENT DOCUMENTS

JP 54-114619 9/1979

* cited by examiner

*Primary Examiner* — Moshe Wilensky
(74) *Attorney, Agent, or Firm* — Crowell & Moring LLP

(57) ABSTRACT

A method for machining an integrally bladed rotor of a fluid-flow machine is disclosed. In accordance with an embodiment of the invention, the method includes the steps of: a) providing an integrally bladed rotor having a main rotor body and several rotor blades integrally attached to the main rotor body; b) determining the natural frequency of each rotor blade of the integrally bladed rotor; and c) machining at least one rotor blade of the integrally bladed rotor by removing material to adjust the natural frequency of the particular rotor blade to a specified value.

16 Claims, 2 Drawing Sheets

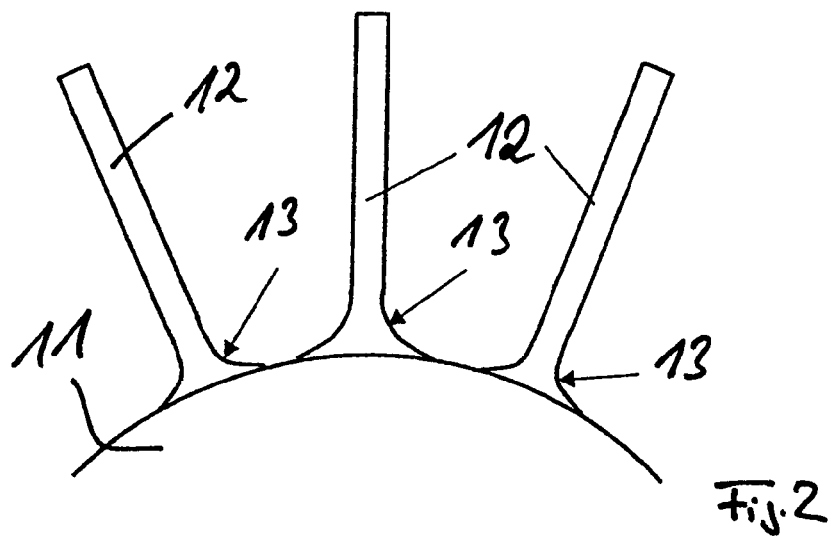
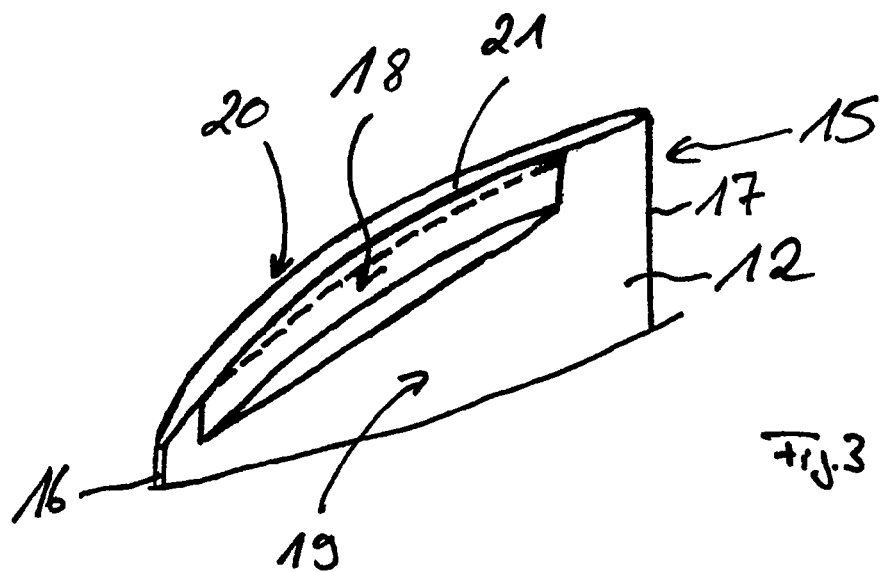
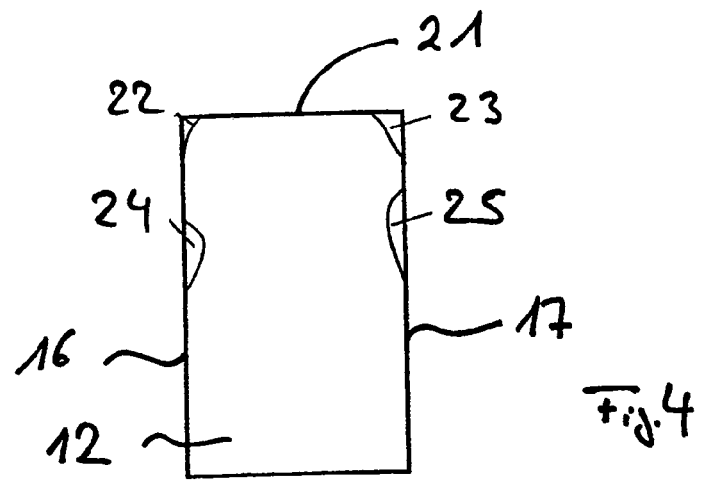

METHOD FOR MACHINING AN INTEGRALLY BLADED ROTOR

This application claims the priority of International Application No. PCT/DE2006/000173, filed Feb. 4, 2006, and German Patent Document No. 10 2005 006 414.0, filed Feb. 12, 2005, the disclosures of which are expressly incorporated by reference herein.

BACKGROUND AND SUMMARY OF THE INVENTION

The invention relates to a method for machining an integrally bladed rotor of a fluid-flow engine, specifically of an integrally bladed compressor rotor for a gas turbine.

Compressor rotors of gas turbines are increasingly designed as integrally bladed rotors. Integrally bladed rotors are also designated as a blisk (bladed disk) or a bling (bladed ring), depending on whether they have a disk-shaped main rotor body or an annular main rotor body. Because of manufacturing inaccuracies in the fabrication of integrally bladed rotors, the rotor blades of the integrally bladed rotor can demonstrate a natural frequency deviating from a desired natural frequency. The result of this can be that with forced vibrations during operation, amplitudes of vibration of individual rotor blades become unacceptably large so that during operation of the fluid-flow engine, or gas turbine, the risk of damage exists.

With this as the starting point, the problem underlying the present invention is to create a method for machining an integrally bladed rotor of a fluid-flow engine.

In accordance with the invention, the method comprises at least the following steps: a) providing an integrally bladed rotor having a main rotor body and several rotor blades integrally attached to the main rotor body; b) determining the natural frequency of each rotor blade of the integrally bladed rotor; c) machining at least one rotor blade of the integrally bladed rotor by removing material to adjust the natural frequency of the particular blade to a specific value.

In the meaning of the present invention, a method is provided with which it is possible to selectively affect the natural frequency of rotor blades on integrally bladed rotors. This makes it possible to reduce the stresses acting on the rotor blades during operation and thus on the integrally bladed rotor and to substantially reduce the risk of damage to the rotor.

The particular rotor blade of the integrally bladed rotor is preferably machined by removing material in the area of a radially inward lying section and/or in the area of a radially outward lying section and/or in the area of the leading edge and/or in the area of the trailing edge.

In the case in which a rotor without an outer shroud is provided as the integrally bladed rotor, the particular rotor blade of the integrally bladed rotor is machined by removing material in the area of a radially inward lying transition section between the main rotor body and the rotor blade and/or in the area of a radially outward lying blade tip section and/or in the area of the leading edge and/or in the area of the trailing edge.

If, on the other hand, a rotor with an outer shroud is provided as the integrally bladed rotor, the particular rotor blade of the integrally bladed rotor is machined by removing material in the area of a radially inward lying transition section between the main rotor body and rotor blade and/or in the area of a radially outward lying transition section between the outer shroud and rotor blade and/or in the area of the leading edge and/or in the area of the trailing edge.

In accordance with a first advantageous further development of the invention, the natural frequency of the particular machined rotor blade is adjusted such that all rotor blades have the same natural frequency.

In accordance with a second advantageous further development of the invention, the natural frequency of the particular machined rotor blade is adjusted such that periodically changing natural frequencies occur around the circumference of the rotor.

Preferred further developments of the invention emerge from the following description. Embodiments of the invention, without being restricted thereto, are explained in more detail using the drawings.

BRIEF DESCRIPTION OF THE DRAWINGS

FIG. 2 shows a section from the integrally bladed rotor from FIG. 1 in a schematic front view;

FIG. 3 shows a section from a blade of the integrally bladed rotor from FIG. 1 in a schematic perspective side view; and FIG. 4 shows a schematic side view of a blade of the integrally bladed rotor from FIG. 1.

DETAILED DESCRIPTION OF THE DRAWINGS

Figure 1:
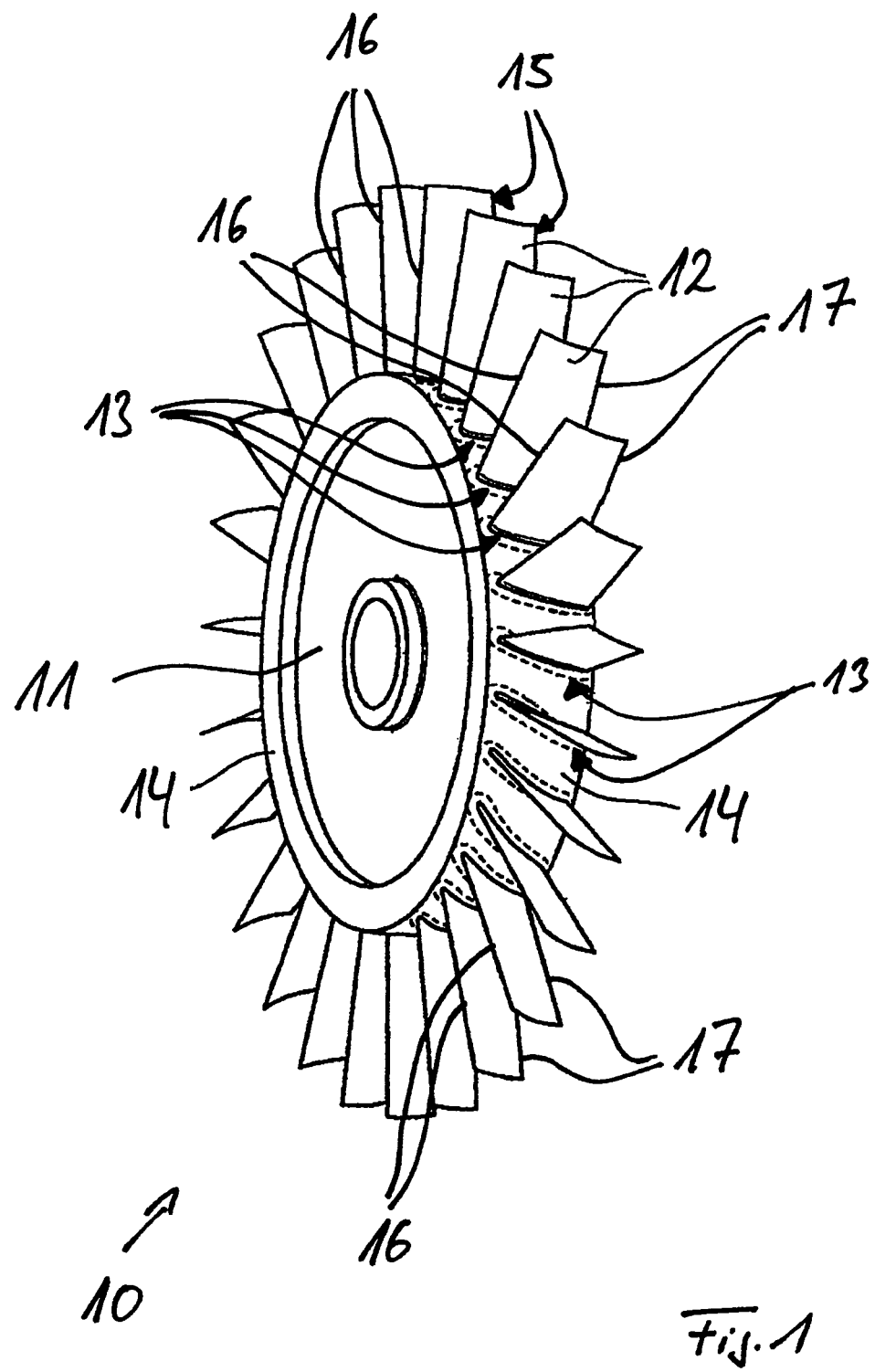
FIG. 1 shows an integrally bladed compressor rotor of a gas turbine in a schematic perspective side view.

In what follows, the invention will be explained in greater detail with reference to FIGS. 1 to 4.

FIG. 1 shows an integrally bladed gas turbine rotor 10 having a disk-shaped main rotor body 11 and several rotor blades 12 integrally attached to the main rotor body. Such integrally bladed gas turbine rotors having a disk-shaped main rotor body are also designated as blisks and are used preferably in the compressor of a gas turbine. The integrally bladed gas turbine rotor 10 shown in FIG. 1 is a rotor without an outer shroud. A transition area is formed between the rotor blades 12 and a hub 14 of the main rotor body 11 in a radially inward lying section of the rotor blades 12. Radially outward lying blade tip sections 15 of the rotor blades 12 are designed in the case of a gas turbine rotor without an outer shroud as open rotor blade tips. Each of the rotor blades 12 possesses a leading edge 16 and a trailing edge 17, where a suction side on the one hand and a pressure side on the other extends between the leading edge 16 and the trailing edge 17 of each rotor blade 12.

The present invention relates to a method for machining an integrally bladed rotor of a fluid-flow engine, specifically the integrally bladed gas turbine rotor 10 without an outer shroud. In the meaning of the present invention, after providing such a gas turbine rotor 10, the natural frequency of each rotor blade 12 of the integrally bladed gas turbine rotor 10 is determined, with the determination being made either by measurement or analytically. After determining the natural frequency of each rotor blade 12 of the integrally bladed gas turbine rotor 10, at least one of the rotor blades 12 is machined by removing material to adjust the natural frequency of the particular rotor blade 12 to a specific value. The removal of material on the particular rotor blade 12 is carried out in the area of the radially inward lying section and/or in the area of the radially outward lying blade tip section 15 and/or in the area of the leading edge 16 and/or in the area of the trailing edge 17 of the particular rotor blade.

In the case of the gas turbine rotor 10 without an outer shroud shown in FIG. 1, the adjustment of the natural frequency of the particular rotor blade 12 of the integrally bladed rotor 10 is made by removing material in the area of the radially inward lying transition section 13 between the main rotor body 11 and the particular rotor blade 12 and/or by removing material in the area of the radially outward lying blade tip section 15 and/or by removing material in the area of the leading edge 16 and/or by removing material in the area of the trailing edge 17.

If the machining of the particular rotor blade 12 is carried out by removing material in the area of the radially inward lying transition section 13 between the main rotor body 11 and the rotor blade 12, a transition radius in this transition section 13 is reduced at least in sections. The transition radii of each rotor blade 12 can vary along the circumference of the blade. FIG. 2 clarifies in schematized form the radially inward lying transition sections 13 between the main rotor body 11 and the rotor blades 12, where, by removing material, the transition radius of each rotor blade to the main rotor body 11 can be adjusted individually as well as varyingly over the circumference of the blade.

As an alternative to, or in addition to, the removal of material in the area of the transition section 13, material removal can also be carried out in the area of the radially outward lying blade tip section 15 on the particular rotor blade 12. FIG. 3 shows a radially outward lying blade tip section 15 of a rotor blade 12 of the gas turbine rotor 10 without an outer shroud, where to adjust the natural frequency of the rotor blade 12 in accordance with FIG. 3 in the radially outward lying blade tip section 15, a squealer tip 18 is introduced. In the embodiment from FIG. 3, the squealer tip 18 is introduced into the radially outward lying blade tip section 15 in the area of a pressure side 19 so that a radially outward lying edge 21 of the rotor blade 12 has an approximately constant thickness between the leading edge 16 and the trailing edge 17. It should be pointed out that a squealer tip of this kind can also be introduced into the radially outward lying blade tip section 15 in the area of a suction side 20.

In combination with, or as an alternative to, the above measures for adjusting the natural frequency of the particular rotor blade 12, the removal of material can also be carried out in the area of the leading edge 16 and the trailing edge 17 of a rotor blade 12. Thus in FIG. 4, a total of four areas 22, 23, 24 and 25 are shown in which material can be removed in the area of the leading edge and the trailing edge 17 to adjust the natural frequency of a rotor blade 12. The areas 22 and 23 are introduced into the leading edge 16 or the trailing edge 17 in the area of the radially outward lying edge 21. The areas 24 and 25 are introduced into a center section of the leading edge 16 or trailing edge 17.

At this point it should be pointed out that, from the point of view of airflow, it is preferable to remove material to adjust natural frequencies of a rotor blade 12 in the radially inward lying transition section 13 in accordance with FIG. 2 and in the radially outward lying blade tip section 15 in accordance with FIG. 3.

If, in contrast to the embodiment shown, a rotor having an outer shroud is provided as the integrally bladed rotor, the particular rotor blade of the integrally bladed rotor is machined to adjust its natural frequency by removing material in the area of a radially inward lying transition section between the main rotor body and the particular rotor blade and/or in the area of a radially outward lying transition section between the outer shroud and the particular rotor blade and/or in the area of the leading edge and/or in the area of the trailing edge. Machining in the area of the radially outward lying transition section between the outer shroud and the particular rotor blade is performed in a similar way to machining in the area of the radially inward lying transition section between the main rotor body and the rotor blade, that is to say, by reducing a transition radius in these transition areas at least in sections through material removal. In this regard, reference can be made to the explanations for FIG. 2. Machining such an integrally bladed gas turbine rotor having an outer shroud in the area of the leading edge and/or the trailing edge can be performed as described in conjunction with FIG. 4 for the integrally bladed gas turbine rotor without an outer shroud.

In the meaning of the present invention, the natural frequency of the particular rotor blades 12 which have to be machined can be adjusted such that all rotor blades 12 of the gas turbine rotor 10 have the same natural frequency. Alternatively, using the method in accordance with the invention, the natural frequency of the particular rotor blades 12 which have to be machined can be adjusted such that the rotor blades 12 have periodically changing natural frequencies around the circumference of the gas turbine rotor 10. In the first case, it is possible to speak of a selective tuning of the natural frequencies, and in the second case of a selective mistuning of the natural frequencies.

In the sense of the present invention, natural frequencies are determined for all rotor blades of an integrally bladed rotor. On the basis of the natural frequencies determined, an investigation is carried out to see whether the natural frequency determined for the rotor blades is deviating from a particular target natural frequency. If this is the case, in order to adjust the natural frequency of the particular rotor blade selectively, the blade is machined by removing material. The removal of the material can be carried out in different sections or areas of the rotor blades.

In conclusion, it should be pointed out that rotor blades can be machined by removing material using the method in accordance with the invention in order to adjust the natural frequency of the blades to a specific value.

What is claimed is:

1. A method for machining an integrally bladed rotor of a fluid-flow machine, comprising the steps of:
    a) providing an integrally bladed rotor having a main rotor body and several rotor blades integrally attached to the main rotor body;
    b) determining a natural frequency of each rotor blade of the integrally bladed rotor; and
    c) machining at least one rotor blade of the integrally bladed rotor by removing material to adjust the natural frequency of the at least one rotor blade to a specified value;
    wherein the at least one rotor blade of the integrally bladed rotor is machined through material removal in an area of a radially inward lying transition section between the main rotor body and the rotor blade such that a radius of a fillet formed between the main rotor body and the rotor blade of the integrally bladed rotor varies as a result of the material removal.

2. The method according to claim 1, wherein the natural frequency of each rotor blade of the integrally bladed rotor is determined by measurement.

3. The method according to claim 1, wherein the natural frequency of each rotor blade of the integrally bladed rotor is determined analytically.

4. The method according to claim 1, wherein a squealer tip is introduced in an area of a pressure side and/or a suction side of the at least one rotor blade through material removal in an area of a radially outward lying blade tip section.

5. The method according to claim 1, wherein the natural frequency of the at least one machined rotor blade is adjusted such that all other rotor blades of the integrally bladed rotor have a same natural frequency.

6. The method according to claim 1, wherein the natural frequency of the at least one machined rotor blade is adjusted such that the natural frequencies of the rotor blades of the integrally bladed rotor periodically change over a circumference of the integrally bladed rotor.

7. The method according to claim 1, wherein the at least one rotor blade of the integrally bladed rotor is machined through material removal in an area of a radially outward lying transition section between an outer shroud and the rotor blade such that a radius of a fillet formed between the outer shroud and the rotor blade varies as a result of the material removal.

8. The method according to claim 1, wherein the integrally bladed rotor is a compressor rotor of a gas turbine.

9. A method for modifying a vibration characteristic of a rotor blade of an integrally bladed rotor of a gas turbine, comprising the steps of:
 determining a natural frequency of the rotor blade of the integrally bladed rotor; and
 machining the rotor blade to modify the natural frequency of the rotor blade;
 wherein the rotor blade of the integrally bladed rotor is machined through material removal in an area of a radially inward lying transition section between a main rotor body and the rotor blade such that a radius of a fillet formed between the main rotor body and the rotor blade of the integrally bladed rotor varies as a result of the material removal.

10. The method according to claim 9, wherein the integrally bladed rotor includes a second rotor blade and further comprising the steps of:
 determining a natural frequency of the second rotor blade of the integrally bladed rotor; and
 machining the second rotor blade to modify the natural frequency of the second rotor blade.

11. The method according to claim 10, wherein the modified natural frequency of the rotor blade is a same frequency as the modified natural frequency of the second rotor blade.

12. The method according to claim 10, wherein the modified natural frequency of the rotor blade is a different frequency than the modified natural frequency of the second rotor blade.

13. The method according to claim 9, wherein the step of machining includes removal of a material that forms the rotor blade.

14. The method according to claim 13, wherein the material is removed from a section of the rotor blade.

15. The method according to claim 9, wherein the rotor blade of the integrally bladed rotor is machined through material removal in an area of a radially outward lying transition section between an outer shroud and the rotor blade such that a radius of a fillet formed between the outer shroud and the rotor blade varies as a result of the material removal.

16. A method for modifying a vibration characteristic of a rotor blade of an integrally bladed rotor of a gas turbine, comprising the steps of:
 determining a natural frequency of the rotor blade of the integrally bladed rotor; and
 modifying the natural frequency of the rotor blade by removing material in an area of a radially inward lying transition section between a main rotor body and the rotor blade such that a radius of a fillet between the main rotor body and the rotor blade of the integrally bladed rotor varies as a result of the removing material.

* * * * *